No. 734,202. Patented July 21, 1903.

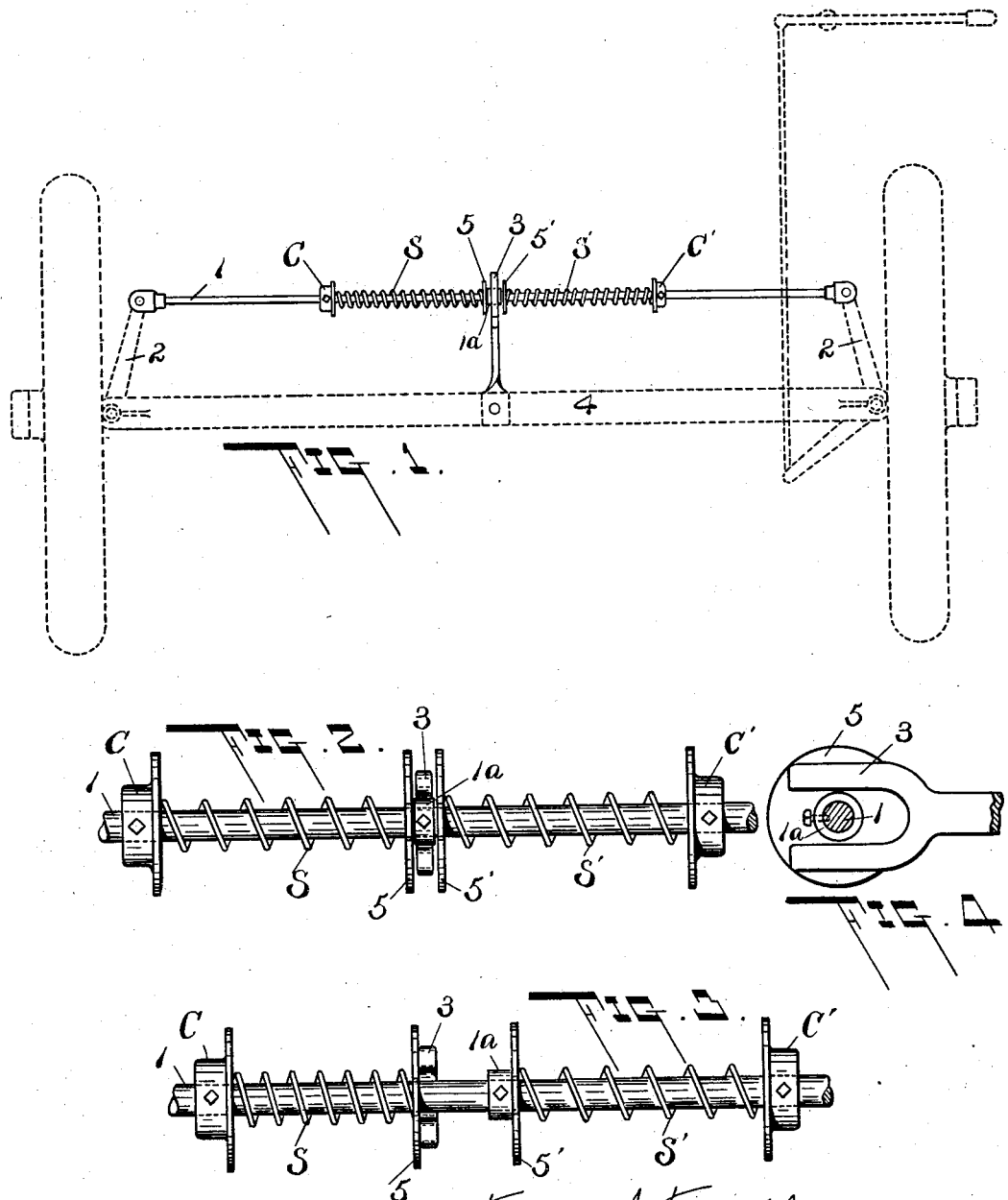

UNITED STATES PATENT OFFICE.

FREMONT J. TROMBLE, OF BAY CITY, MICHIGAN, ASSIGNOR OF ONE-HALF TO HARRISON W. GARLAND, OF BAY CITY, MICHIGAN.

STEERING DEVICE FOR MOTOR-VEHICLES.

SPECIFICATION forming part of Letters Patent No. 734,202, dated July 21, 1903.

Application filed May 7, 1903. Serial No. 156,066. (No model.)

*To all whom it may concern:*

Be it known that I, FREMONT J. TROMBLE, a citizen of the United States, residing at Bay City, in the county of Bay and State of Michigan, have invented certain new and useful Improvements in Steering Devices for Motor-Vehicles; and I do hereby declare the following to be a full, clear, and exact description of the invention, such as will enable others skilled in the art to which it appertains to make and use the same.

This invention is a steering device for motor-vehicles. Its object is to reduce the vibration and jar produced in the steering-handle by the wheels when running over uneven roads and to render steering easier, smoother, and more accurate.

My invention is illustrated in the accompanying drawings, in which—

Figure 1 is a top plan view of the device, the running-gear of the vehicle being indicated by dotted lines. Fig. 2 is a rear view showing the positions of the cushioning-springs when running straight ahead. Fig. 3 is a similar view showing the cushioning-springs when the wheels are turned, as in rounding a corner. Fig. 4 is a detail side view of the centering-arm.

A pair of cushioning-springs S and S', carried by the link 1, that connects the two wheel-guiding arms 2, are arranged on each side of a fixed arm or equivalent member 3, carried by any convenient part of the vehicle-body or secured to the front axle 4, as in Fig. 1. The outer ends of the springs are secured to the link 1 in any suitable manner, as by adjustable set-collars C and C'. The inner end of each spring has a washer 5 5' slidable on the link 1, so that either spring can be compressed by pressure on its inner end. Between the slidable washers 5 and 5' is the arm 3, adapted to compress one spring or the other as the link 1 moves lengthwise in steering. The office of the opposing springs S and S' is to restore the wheels to their central or straight-ahead position when they are temporarily deflected by bounding over obstructions or unevenness in the road. Without such cushioning members every small jerk of the wheels causes a corresponding vibration or tug on the steering-handle and makes it necessary for the operator to hold the handle firmly and remain constantly on guard to prevent being suddenly swerved from his course.

To render the device more effective in eliminating jar on the steering-handle by reducing the sensitiveness of the wheels to lateral displacement, I provide means whereby one of the springs is held inoperative, while the other is compressed by the movement of the link 1. By this arrangement both springs can be kept under initial compression and yet operate perfectly independent of each other, so that the full effect of one spring is exerted on the link 1 as soon as the link moves lengthwise without any counter-pressure being exerted by the other spring. The means I employ to effect these results is illustrated in Figs. 2, 3, and 4. The arm 3 is slotted to permit a collar $1^a$ on the link 1 to pass freely through it as the link moves back and forth in executing the various operations of steering. When the wheels are in their straight-ahead position, the collar $1^a$ is in line with the fixed arm 3 and the slidable washers 5 5' are pressed against its ends by the springs S and S', as shown in Figs. 1 and 2. If, however, the wheels are suddenly deflected by an obstruction in the road, link 1 will suddenly move lengthwise, say, to the right, as in Fig. 3. The collars $1^a$ and C' confine the spring S', which remains inoperative, although still under its initial pressure; but the movement of the link 1 presses the washer 5 against the fixed arm 3, so that the spring S is compressed between the arm and the collar C. The reaction of spring S immediately restores link 1 and the steering-wheels to their normal positions, thus relieving the operator of that labor, which he would otherwise have to perform in overcoming the sudden jerk of the steering-handle.

The wheels may be made more or less sensitive to sudden deflection by altering the initial compression of the spring S and S'. This is accomplished by adjusting the collars C and C' lengthwise the shaft, so as to compress the springs to any extent desired. The collars are provided with set-screws or similar devices for that purpose.

While I have shown my invention as applied to what is commonly known as the "side-steering" type of motor-vehicle, it may equally well be applied to the "center-steering" or other type.

What I claim as my invention, and desire to secure by Letters Patent, is as follows:

1. In a device of the class described the combination with the longitudinally-movable steering-link of a motor-vehicle; a fixed slotted arm carried by the front axle; a collar on said link arranged to register with the fixed arm when the steering-link is in straight-ahead position; and adapted to pass transversely through the slot of said arm when the link moves lengthwise; a slidable washer each side of said collar and a pair of springs carried by said link, each spring having its outer end secured to the link and longitudinally adjustable thereon; its inner end being movable thereon and normally pressing against said collar.

2. In combination with the longitudinally-movable steering-link of a motor-vehicle; a collar on said link; a pair of springs carried by said link, one on each side of said collar; the outer end of each spring being secured to the link and its inner end being slidable thereon and normally pressing against said collar; together with a fixed arm carried by the vehicle-body and arranged to register with said collar when the steering-link is in straight-ahead position and to compress one of said springs when the steering-link moves longitudinally.

3. In a device of the class described; the longitudinally-movable steering-link; a pair of compressible springs mounted thereon and having their outer ends secured thereto; a collar fixed to the links between the inner ends of said springs; together with a fixed arm carried by the vehicle-body, adapted to register with said collar when the link is in straight-ahead position and to actuate one only of said springs when the link moves longitudinally.

In testimony whereof I affix my signature in presence of two witnesses.

FREMONT J. TROMBLE.

Witnesses:
GEO. B. WILLCOX,
A. A. EASTERLY.